United States Patent
Kubota et al.

(10) Patent No.: US 11,988,745 B2
(45) Date of Patent: May 21, 2024

(54) DISTANCE MEASURING DEVICE

(71) Applicant: Kabushiki Kaisha Toshiba, Tokyo (JP)

(72) Inventors: Hiroshi Kubota, Tokyo (JP); Tomonori Fukushima, Kanagawa (JP); Nobu Matsumoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 16/803,182

(22) Filed: Feb. 27, 2020

(65) Prior Publication Data

US 2020/0191961 A1 Jun. 18, 2020

Related U.S. Application Data

(62) Division of application No. 15/263,614, filed on Sep. 13, 2016, now Pat. No. 10,613,225.

(60) Provisional application No. 62/221,477, filed on Sep. 21, 2015.

(51) Int. Cl.
| | |
|---|---|
| *G01S 17/10* | (2020.01) |
| *G01S 7/4865* | (2020.01) |
| *G01S 7/487* | (2006.01) |
| *G01S 17/42* | (2006.01) |

(52) U.S. Cl.
CPC ............ *G01S 17/10* (2013.01); *G01S 7/4865* (2013.01); *G01S 7/487* (2013.01); *G01S 17/42* (2013.01)

(58) Field of Classification Search
CPC ........ G01S 17/10; G01S 7/4865; G01S 7/487; G01S 17/42
See application file for complete search history.

(56) References Cited

U.S. PATENT DOCUMENTS

| | | | |
|---|---|---|---|
| 8,724,096 B2 | 5/2014 | Goseh et al. | |
| 2003/0218919 A1 | 11/2003 | Arita et al. | |
| 2004/0070748 A1 | 4/2004 | Inaba et al. | |
| 2011/0194099 A1 | 8/2011 | Kamiyama | |
| 2012/0154786 A1* | 6/2012 | Gosch | G01S 17/42 |
| | | | 356/5.01 |
| 2012/0261516 A1 | 10/2012 | Gilliland et al. | |
| 2013/0050426 A1* | 2/2013 | Sarmast | H04N 13/25 |
| | | | 348/E13.064 |
| 2016/0274237 A1* | 9/2016 | Stutz | G01S 17/36 |

FOREIGN PATENT DOCUMENTS

JP 2010-256205 A 11/2010

* cited by examiner

*Primary Examiner* — Luke D Ratcliffe

(74) *Attorney, Agent, or Firm* — Kim & Stewart LLP

(57) ABSTRACT

According to an embodiment, a distance measuring device measures a distance to the measured object base on light scattered on the measured object is detected. The distance measuring device includes an optical detector and a measurer. The optical detector detects the scattered light. The measurer has a sampler to sample a signal corresponding to an output signal of the optical detector every time when the light is emitted at a plurality of sampling time points and a storage to accumulate sampling values and store an accumulation value at each sampling time point. The measurer measures the distance based on a plurality of accumulation values at the sampling time points.

14 Claims, 11 Drawing Sheets

FIRST DISTANCE SEGMENT T1

TIME (DISTANCE) 1ns ← 32a
TIME (DISTANCE) 2ns ← 32a
TIME (DISTANCE) 3ns ← 32a
TIME (DISTANCE) 4ns ← 32a
TIME (DISTANCE) 5ns ← 32a

⋮

SECOND DISTANCE SEGMENT T2

TIME (DISTANCE) 200ns ← 32b
TIME (DISTANCE) 204ns ← 32b
TIME (DISTANCE) 208ns ← 32b
TIME (DISTANCE) 212ns ← 32b
TIME (DISTANCE) 216ns ← 32b

⋮

} 32

FIG. 6 ized by measuring device 1. An oscillator 11a, a drive circuit 11b, a lens 12, optical
DISTANCE MEASURING DEVICE

CROSS REFERENCE TO RELATED APPLICATIONS

This application is a division of application Ser. No. 15/263,614 filed Sep. 13, 2016 and is based upon and claims the benefit of priority from the prior U.S. Provisional Patent Application No. 62/221,477 filed on Sep. 21, 2015, the entire contents of which are incorporated herein by reference.

FIELD

Embodiments described herein relate generally to a distance measuring device.

BACKGROUND

A distance measuring device called a LIDAR (Light Detection and Ranging; Laser Imaging Detection and Ranging) is known. With this device, a measured object is irradiated with pulse light from a light source and scattered light scattered with the measured object is detected by an optical detector. Turnaround time of the light is longer as a distance from the distance measuring device to measured object, that is, an optical path length is longer. Therefore, the distance can be measured by using a time difference between a time point when the light source emits the light and a time point when the scattered light is detected. Furthermore, a distance image of the measured object can be generated by scanning the pulse light of the measured object to measure the distances to positions on the measured object.

Power of the light emitted from the light source is approximately a product of the number of points to be measured (number of points in one frame), power of the light emitted to single point, and a frequency of measurement (frame rate). In order to secure safety, power of light emitted from a light source is restricted. Therefore, these three cannot be made large simultaneously.

When a moving measured object is measured, for example, a frame rate not less than 10 fps is needed. Moreover, when a measured object in a long distance is measured, light strong in power is needed to be emitted for single point. This causes a less number of points to be measured and a distance image in high resolution cannot be obtained. On the other hand, in the case of a greater number of points to be measured, the frame rate is needed to be lowered and measurement for a long distance is needed to be given up.

BRIEF DESCRIPTION OF THE DRAWINGS

FIG. 6 is a block diagram illustrating a configuration of a storage according to a third embodiment;

DETAILED DESCRIPTION

According to an embodiment, a distance measuring device intermittently emits light to a measured object and measures a distance to the measured object based on time from the emission of light until scattered light of the light scattered on the measured object is detected. The distance measuring device includes an optical detector and a measurer. The optical detector detects the scattered light. The measurer has a sampler to sample a signal corresponding to an output signal of the optical detector every time when the light is emitted at a plurality of sampling time points and a storage to accumulate sampling values and store an accumulation value at each sampling time point. The plurality of sampling time points are segmented into at least first and second segments. The measurer measures the distance based on a plurality of first accumulation values at the sampling time points in the first segment and initialize the first accumulation value every time when a first ending condition is satisfied. The measurer measures the distance based on a plurality of second accumulation values at the sampling time points in the second distance segment and initialize the second accumulation value every time when a second ending condition is satisfied.

Hereinafter, embodiments of the present invention will be described with reference to the drawings. The embodiments do not limit the present invention.

First Embodiment

Figure 1:
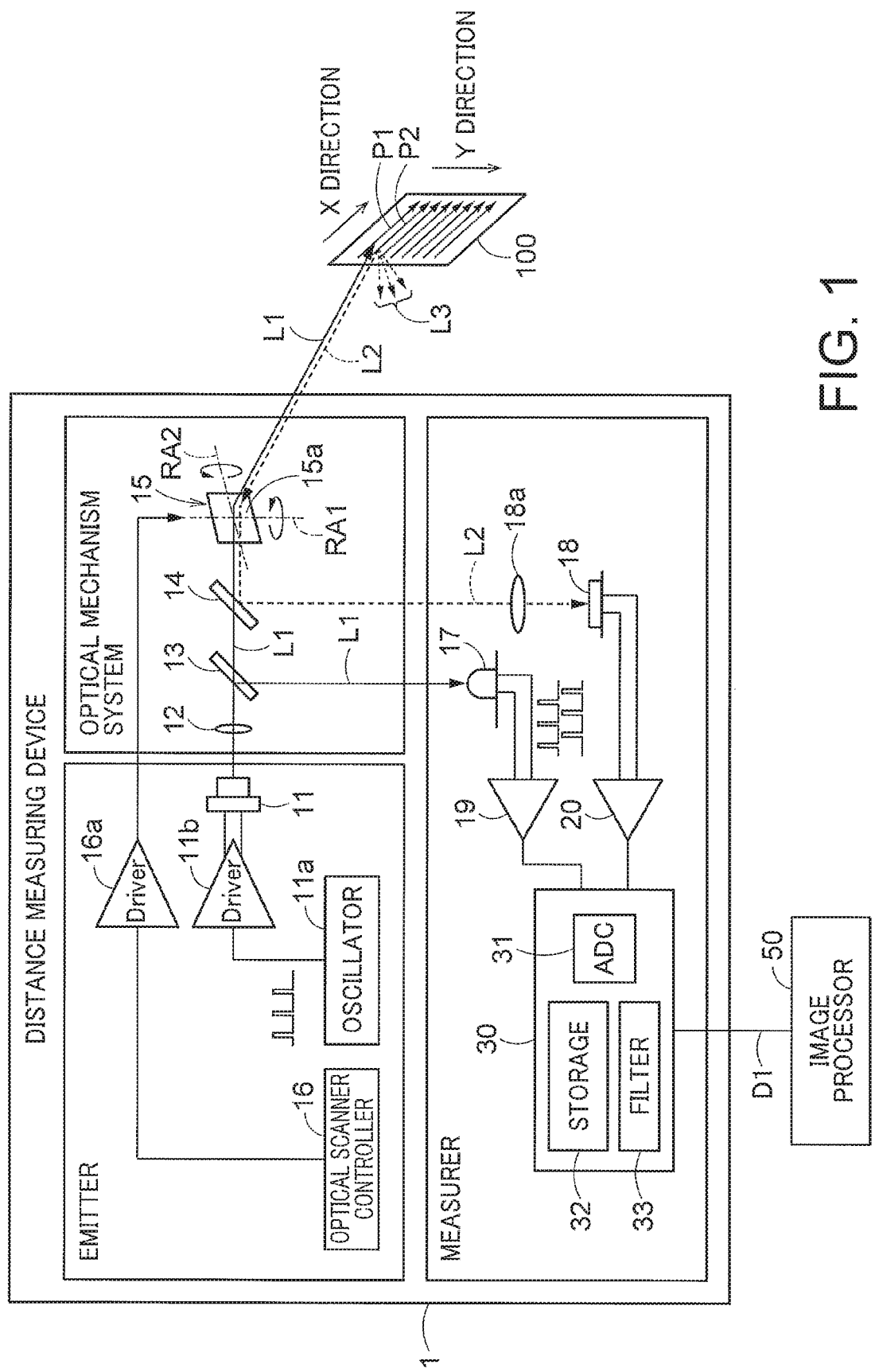
FIG. 1 is a diagram illustrating of a schematic configuration of a distance measuring device according to a first embodiment.

FIG. 1 is a diagram illustrating a schematic configuration of a distance measuring device 1 according to a first embodiment. The distance measuring device 1 generates a distance image of a measured object 100 using a scanning system and a TOF system. Specifically, the distance measuring device 1 intermittently emits light L1 to the measured object 100 and measures a distance to the measured object 100 based on time from the emission of the light L1 until scattered light L2 of the light L1 scattered on the measured object 100 is detected.

The distance measuring device 1 includes a light source 11, an oscillator 11a, a drive circuit 11b, a lens 12, optical elements 13 and 14, a reflection device (movable mirror) 15, a scanning controller (optical scanner controller) 16, a drive circuit 16a, optical(photo) detectors 17 and 18, a lens 18a, amplifiers 19 and 20, and a measurer 30. One of the ways to scan light other than movable mirrors is rotation of light source 11, lens 12, the photo detectors 17, 18 and lens 18a, which is called as rotation method henceforth. Another way to scan lights is Optical phased array, which is called as OPA henceforth. The proposed method does not depend on methods to scan lights, so it can use rotation method and OPA as well.

The oscillator 11a generates a pulse signal. The drive circuit 11b drives the light source 11 based on the pulse signal. The light source 11 is, for example, a laser light source such as a laser diode and intermittently emits the light L1 in response to the drive by the drive circuit 11b. In other words, the light L1 is pulse light.

On an optical path of the light L1 emitted from the light source 11, the lens 12, the optical elements 13 and 14 and the reflection device 15 are provided in this order.

The lens 12 collimates the light L1 to guide it to the optical element 13.

The optical element 13 transmits the light L1 and causes a part of the light L1 to enter the optical detector 17. The optical element 13 may be, for example, a splitter or the like.

The optical element 14 causes the light L1 transmitted through the optical element 13 to enter the reflection device 15.

The reflection device 15 has a reflective surface (mirror surface) 15a to change a reflection direction of the light L1. The reflective surface 15a scans the reflected light L1 and reflects the scattered light L2 scattered on the measured object 100. The reflection device 15 changes the reflection direction of the light L1 by continuously changing an inclination angle of the reflective surface 15a in accordance with a drive signal supplied from the scanning controller 16 via the drive circuit 16a. The reflective surface 15a is pivotable, for example, around two pivot axes RA1 and RA2 intersecting each other.

The reflective surface 15a scans the light L1 sequentially along a plurality of straight paths which are substantially horizontal with it being displaced on those in a vertical direction. In other words, the light L1 is scanned on a straight path P1 in an X-direction (horizontal direction), and next, on a straight path P2 which is displaced in a Y-direction (vertical direction) in the X-direction. The light L1 is being moved sequentially, and thereby, the straight paths are irradiated with pulse light. Notably, the number of the straight paths or the scanning direction is not specially limited.

The light L1 of the irradiation is scattered on the measured object 100. The light L1 that is scattered on the measured object 100 (hereinafter called the scattered light L2) travels on the optical path substantially same as the light L1 in the reverse direction. The scattered light L2 is also pulse light. The scattered light L2 reflected on the reflective surface 15a enters the optical element 14.

Notably, in FIG. 1, the optical paths of the light L1 and the scattered light L2 are separately illustrated for clarity, which substantially overlap with each other in reality. Moreover, there are illustrated the center optical path of the light beam of the light L1 and the center optical path of the light beam of the scattered light L2 which is entered into the reflective surface 15a. Scattered light L3 that travels off the light beam of the scattered light L2 does not enter the optical detector 18.

The optical element 14 changes the scattered light L2, in its traveling direction, reflected on the reflective surface 15a. The lens 18a collects the reflected light and causes it to enter the optical detector 18. The optical element 14 may be, for example, a half mirror or a mirror with a hole.

The optical detector 18 detects the scattered light L2 entering from the lens 18a. The amplifier 20 amplifies an output signal of the optical detector 18 and performs band-pass filter.

Meanwhile, the optical detector 17 detects the light L1 entering from the optical element 13. The amplifier 19 amplifies an output signal of the optical detector 17 and performs band-pass filter.

The measurer 30 receives output signals of the amplifiers 19 and 20 and measures a distance (optical path difference) from the reflective surface 15a to the measured object 100 based on detection results of the optical detectors 17 and 18. Specifically, the measurer 30 measures the distance using a time difference between a time point when the optical detector 17 detects the light L1 and a time point when the optical detector 18 detects the scattered light L2. The larger the time difference is, the longer the distance is.

The measurer 30 has an AD converter (sampler) 31, a storage 32 and a filter 33.

Every time when the light L1 is emitted, the AD converter 31 samples the output signal of the amplifier 20 (namely, a signal corresponding to the output signal of the optical detector 18) at a plurality of sampling time points (sampling times).

Figure 2:
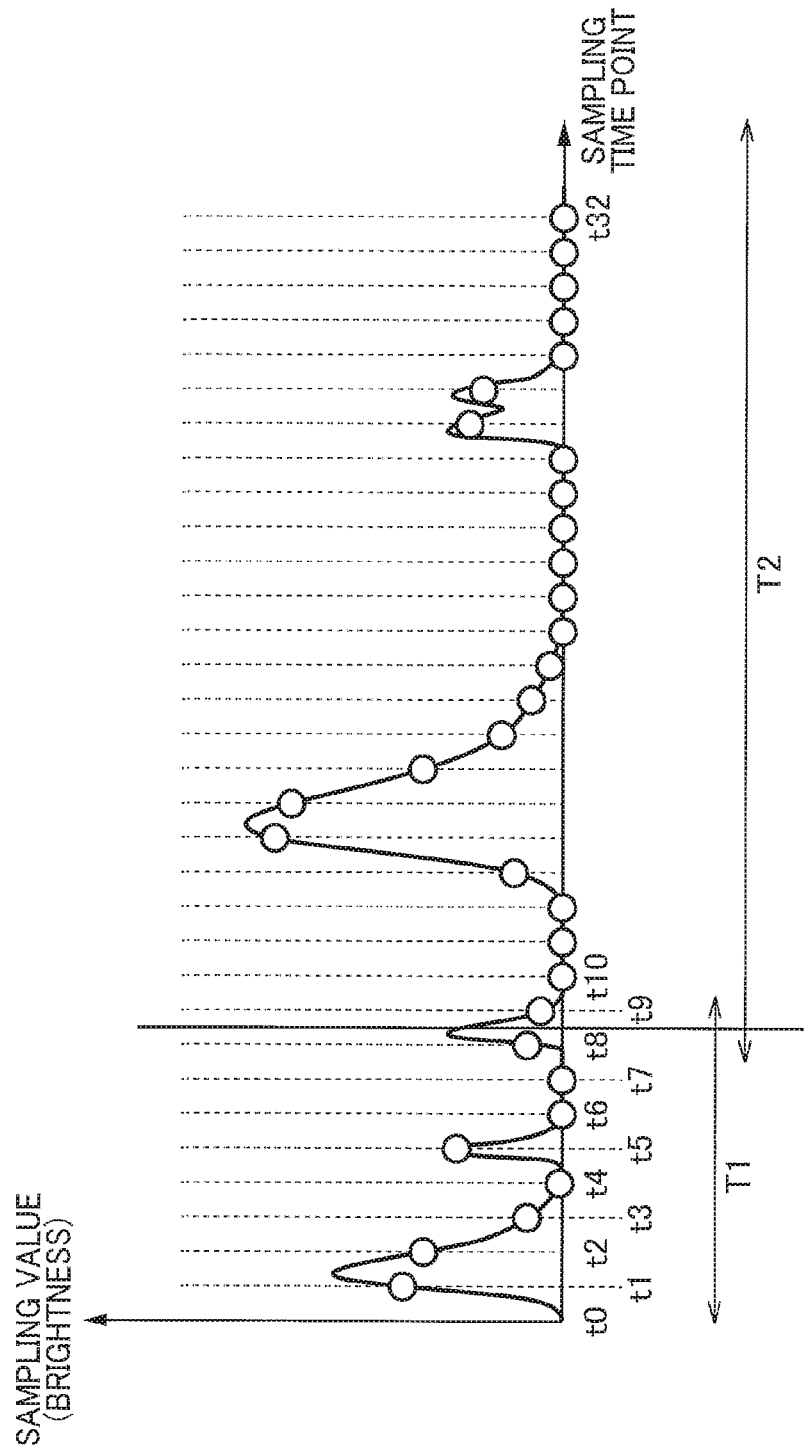
FIG. 2 is a diagram exemplarily illustrating sampling values of an output signal of an optical detector.

FIG. 2 is a diagram exemplarily illustrating sampling values of the output signal of the optical detector 18. In FIG. 2, the vertical axis represents a sampling value (brightness) and the horizontal axis represents a sampling time point. The sampling time point corresponds to a distance. The distance is obtained from 2×the speed of light×(the sampling time point-the time point when the optical detector 17 detects the light L1). The number of the sampling time points illustrated is merely exemplary and not specially limited.

In FIG. 2, although diagram is simplified so that the analog valued and sampled value at the sampling time are the same, analog value usually does not match to the sampled value in detail because the analog values is converted after it is charged in the capacitor (integrated in a certain period).

The plurality of sampling time points t1 to t32 are segmented into a first distance segment (first segment) T1 and a second distance segment (second segment) T2 near a boundary between t8 and t9. The sampling time points in the first distance segment T1 are earlier than the sampling time points in the second distance segment T2 as a whole. Accordingly, the first distance segment T1 represents a relatively shorter distance. The second distance segment T2 represents a relatively longer distance. A part of the first distance segment T1 overlaps with a part of the second distance segment T2. Namely, a part of the sampling time points in the first distance segment T1 which are positioned near the boundary are also included in the second distance segment T2. In this way, a peak which corresponds to the reflected light L2 near the boundary can also be detected.

When the distance to the measured object 100 is relatively short, a relatively intense peak arises in the sampling values in the first distance segment T1.

When the distance to the measured object 100 is relatively long, a relatively weak peak arises in the sampling values in the second distance segment T2.

Herein, there is described an example in which the plurality of sampling time points are segmented into the first and second distance segments T1 and T2. The distance segment is sufficient to be segmented into at least two. A similar configuration is possible also in the case of three or more distance segments.

The storage 32 stores a value obtained by accumulating the sampling values at each sampling time point.

Figure 3:
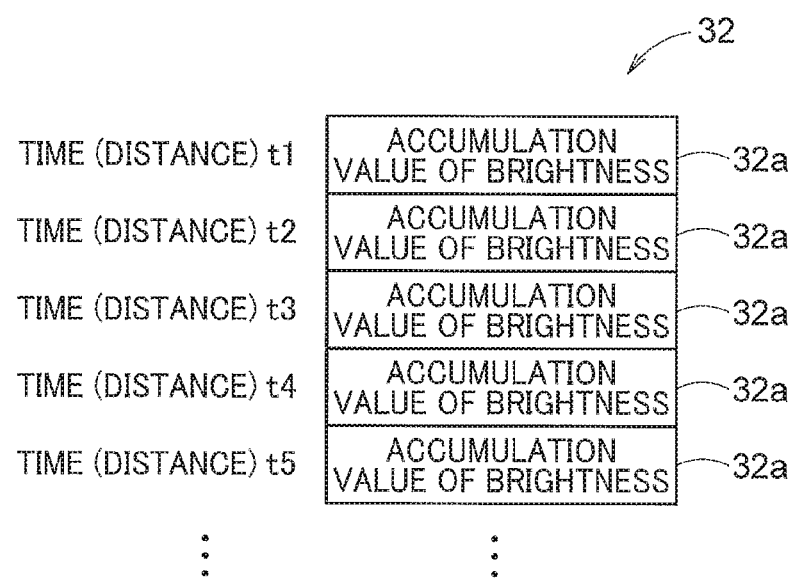
FIG. 3 is a block diagram illustrating a configuration of a storage in FIG. 1.

FIG. 3 is a block diagram illustrating a configuration of the storage 32. The storage 32 has a plurality of buffers 32a each of which accumulates the sampling values for the corresponding sampling time point (time). Namely, an accumulation value of the sampling values is stored in each buffer 32a.

The measurer 30 measures the distance based on a first accumulation value for each sampling time point in the first distance segment T1 every time when a first ending condition is satisfied. After that, the first accumulation value is initialized.

The first ending condition is, for example, that emission counts of the light L1 reach a first number of times or that the first accumulation value reaches a first value. The first number of times may be, for example, any of one time to several times.

The measurer 30 measures the distance based on a second accumulation value for each sampling time point in the second distance segment T2 every time when a second ending condition is satisfied. After that, the second accumulation value is initialized.

The second ending condition is, for example, that the emission counts of the light L1 reach a second number of times or that the second accumulation value reaches a second value. The second number of times is greater than the first number of times and may be, for example, tens of times. The second value may be equal to the first value or different therefrom. Since peaks in the second distance segment T2 are usually smaller than peaks in the first distance segment T1, the emission counts of the light L1 in the occasion when the second accumulation value reaches the second value are greater than the emission counts of the light L1 in the occasion when the first accumulation value reaches the first value.

Specific measurement of the distance is described. The digital signal-processing filter 33 performs digital processing to first time series data Dt1 constituted of a plurality of first accumulation values and determines the distance every time when the first ending condition is satisfied. The digital signal-processing filter 33 performs digital processing to second time series data Dt2 constituted of a plurality of second accumulation values and determines the distance every time when the second ending condition is satisfied.

As the digital signal-processing filter 33, for example, a FIR (Finite Impulse Response) filter, an IIR (Infinite Impulse Response) filter, a Butterworth low-pass filter, a Savitzky-Golay (S-G) filter or the like may be used.

Figure 4A:
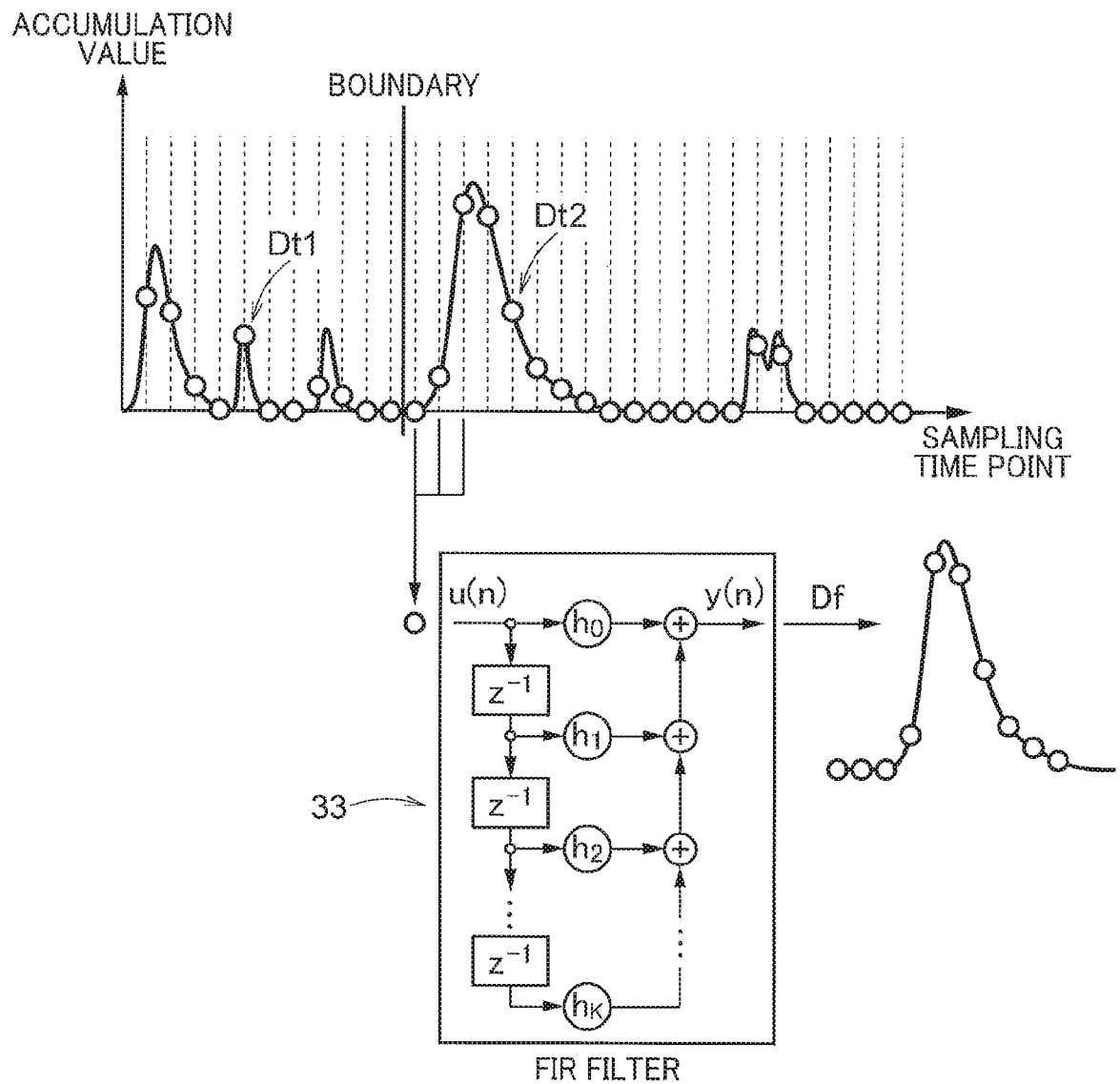
FIG. 4A is a diagram for explaining processing through a low-pass filter.

FIG. 4A is a diagram for explaining processing through the digital signal-processing filter 33. FIG. 4A illustrates an example in which the second time series data Dt2 is supplied to the digital signal-processing filter (FIR filter) 33. The digital signal-processing filter 33 outputs output data Df.

The measurer 30 detects a pulse included in the output data Df and measures the distance based on a position of the pulse. For example, the measurer 30 may detect a shape of the pulse to detect a peak position of the pulse or a rising edge position of the pulse as the position of the pulse. The measurer 30 may detect a measurement of the peak, an area of the pulse or the like. A brightness image can also be obtained based on the measurement of the peak or the area of the pulse.

Figure 4B:
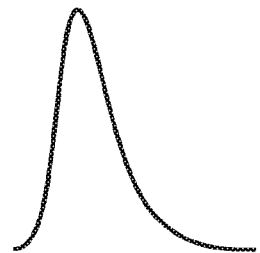
FIG. 4B is a diagram illustrating one example of an ideal response waveform of the optical detector.

Detection of the shape of the pulse is described. For example, when a SiPM (Silicon Photomultiplier) which is a so-called photon counting device is used as the optical detector 18, an ideal response waveform (waveform of the output signal of the optical detector 18) in the case where one photon is received is a waveform illustrated in FIG. 4B.

Therefore, the digital signal-processing filter 33 is beforehand optimized such that output data Df which is the cross-correlation function (or the cross-correlation function multiplied by a constant) of the ideal response waveform and the pulse is outputted.

In this way, it can be determined whether or not pulses in the first time series data Dt1 and the second time series data Dt2 fit the ideal response waveform, by using the digital signal-processing filter 33. Accordingly, pulses, in the first time series data Dt1 and the second time series data Dt2, that do not fit the ideal response waveform can be determined as noise or the like so as not to be used for measurement of the distance.

The description mentioned above is the case when a light pulse is short enough compared with ideal response time of a single photon, and if it is not the case, an ideal response waveform is the convolution integral, cross correlation function, of light pulse and an ideal response of single photon.

Moreover, a response waveform in the occasion when the optical detector 18 simultaneously receives a plurality of photons is approximately an integral multiple of the ideal response waveform. Therefore, a waveform having the waveform in the first time series data Dt1 or the second time series data Dt2 divided by this integer value can fit the ideal response waveform. The distance is obtained from the sampling time point of the pulse in the case of having fitted and the measurement of the peak is obtained from the integer value.

When there are detected a plurality of pulses that fit the ideal response waveform, it is sufficient that pulses not more than a predefined number of those are selected based on predefined selection standards. For example, the measurements of the peaks may be normalized as reflectivities based on the distances and an intensity of the light L1 to select pulses that have large reflectivities.

The measurer 30 generates a distance image D1 of the measured object 100 based on the measured distance and the inclination angle of the reflective surface 15a. The distance image D1 includes first distance image data obtained from the first distance segment T1 and second distance image data obtained from the second distance segment T2. Moreover, the distance image D1 can specify a position, on the measured object 100, irradiated with the light L1 based on the inclination angle. Each pixel in the distance image is based on the distance to each corresponding position on the measured object 100. Accordingly, the distance image reflects a surface shape (3D shape) of the measured object 100.

An image processor 50 performs noise reduction, distortion correction, interpolation processing and the like on the distance image D1 to output a final distance image. The image processor 50 may be included in the distance measuring device 1.

As above, in the first distance segment T1, the distance corresponding to one pixel is obtained from relatively less emission counts of the light L1. Therefore, a distance image in high resolution is obtained.

In the second distance segment T2, the distance corresponding to one pixel is obtained from relatively more emission counts of the light L1. Therefore, resolution of the distance image is coarse. Meanwhile, since the value obtained by accumulating more peak values (second accumulation value) is used, long-distance measurement precision can be enhanced while one emission of the light L1 only results in a small peak value.

For example, in the case where a distant object and a close object co-exists as the measured object, information of the distant object is included in the second distance image data for the second distance segment T2 and information of the close object is included in the first distance image data for the first distance segment T1.

Moreover, for example, in the case where rain, dust, near vehicle's glass, a part of a near vehicle with high reflectivity or the like is in a short distance while a distant object is present, information of the distant object is included in the second distance image data not in the first distance image data. Information of rain or the like is included in the first distance image data not in the second distance image data.

Accordingly, long-distance measurement does not fail since accumulation of the peak values of the scattered light L2 from the distant object is not prevented while rain or the like is closely present.

As described above, according to the present embodiment, resolution of the distance image can be enhanced when the measured object 100 is near. Moreover, the distance can be measured even in the case of weak scattered light L2 and measurement precision of the distance can be improved, when the measured object 100 is distant.

Notably, the distance measuring device 1 that is of scanning type has been described above. Nevertheless, the distance measuring device 1 may repeatedly emit pulse light to single point without scanning. In this case, measurement frequency of the distance can be enhanced for a close measured object 100 and measurement precision of the distance can be improved for a distant measured object 100.

Comparative Example

A distance measuring device of a comparative example that the inventers and others have known is herein described. For the distance measuring device of the comparative example, distance segments are not provided but intensities of scattered light at neighboring emission points are sequentially accumulated. Then, when the accumulation value exceeds a threshold, the distance is measured based on the peak position. In a short distance where the intensity of the scattered light is large, the accumulation value exceeds the threshold in a small number of times. As a result, the distances to many points can be obtained. Moreover, when the scattered light at a certain emission point solely exceeds the threshold, the accumulation value so far is reset to measure the distance only to this single point. In a long distance where the intensity of the scattered light is small, a large number of accumulations are needed for the excess over the threshold. When during the accumulations, intense environmental light noise or the like causes the excess over the threshold at single point, the accumulation value is reset, which results in failure of the long-distance measurement. As mentioned above, in the present embodiment, such failure in long-distance measurement can be configured not to occur.

Second Embodiment

In a second embodiment, the first and second ending conditions are changed in accordance with the measurement of noise such as environmental light. Hereafter, difference from the first embodiment is mainly described.

Figure 5:
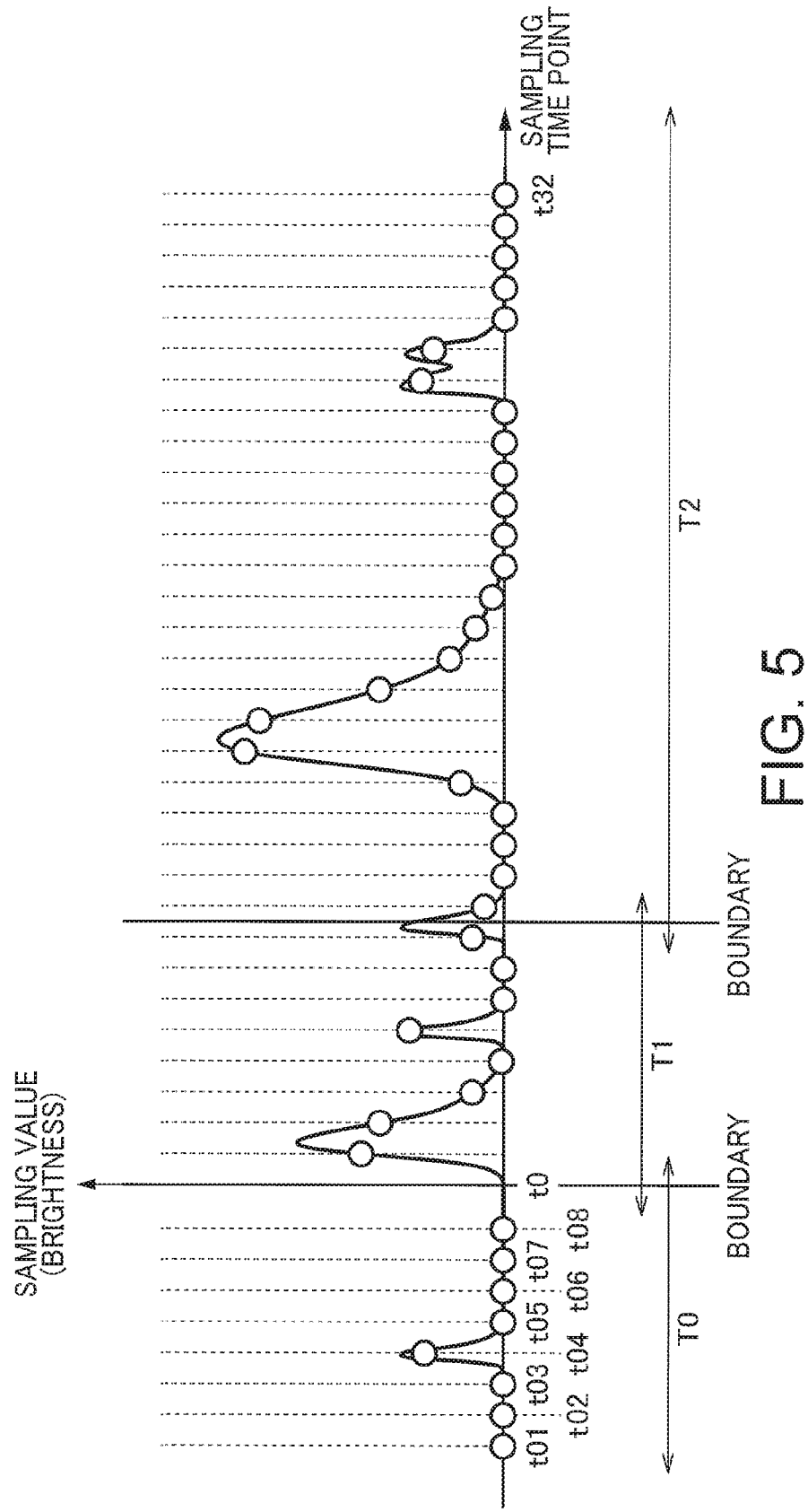
FIG. 5 is a diagram exemplarily illustrating sampling values according to a second embodiment.

FIG. 5 is a diagram exemplarily illustrating sampling values according to the second embodiment. The AD converter 31 samples the signal corresponding to the output signal of the optical detector 18 also at sampling time points t01 to t08 in a third distance segment (third segment) T0 before the light L1 is emitted. The sampling time points t01 to t08 in the third distance segment T0 are earlier than the sampling time points in the first distance segment T1. The light detected in the third distance segment T0 by the optical detector 18 is environmental light such as sunlight, that is, noise.

An S/N of the output signal of the optical detector 18 deteriorates in inverse proportion to the square root of intensity of the environmental light. Meanwhile, the S/N is improved in proportion to the square root of the emission counts of the light L1 (namely, the accumulation number of times of the sampling values). Therefore, in the present embodiment, the measurer 30 changes the first and second ending conditions in accordance with the sampling values which represent the intensity of the environmental light in the third distance segment T0. Specifically, the measurer 30 makes the first and second numbers of times smaller as the peak value in the sampling values in the third distance segment T0 is smaller. The measurer 30 makes the first and second numbers of times larger as the peak value in the sampling values in the third distance segment T0 is larger.

For example, in the second distance segment T2 for a long distance, when the intensity of the environmental light becomes ½, the second number of times may be made ½. Here, a minimum value of the second number of times may be predefined, and when a harf of the number of times is less than the minimum value, the second number of times may be configured to be the minimum value.

Moreover, in the first distance segment T1 for a short distance, when the intensity of the environmental light becomes ½, the first number of times may be made ½. Here, a minimum value of the first number of times may be predefined, and when a half of the number of times is less than the minimum value, the first number of times may be configured to be the minimum value.

As above, according to the present embodiment, the first and second numbers of times are made small under an excellent environmental condition where environmental light is weak, which enables the distance image to be in higher resolution.

Moreover, the first and second numbers of times are made large under a condition where environmental light is intense, which enables influence of noise due to the environmental light to be suppressed and the distance to be measured in higher precision.

Notably, the measurer 30 may accumulate the sampling values in the third distance segment T0, and for each predetermined number of times of accumulation, the first and second ending conditions may be changed based on the accumulation value to initialize the accumulation value. In this way, detection precision of the intensity of environmental light can be improved.

Third Embodiment

In a third embodiment, different temporal resolutions in accumulation are employed for the individual distance segments. Hereafter, difference from the first embodiment is mainly described.

FIG. 6 is a block diagram illustrating a configuration of the storage 32 according to a third embodiment. The storage 32 has a plurality of first buffers 32a and a plurality of second buffers 32b.

Each first buffer 32a accumulates a sum total of the sampling values for N corresponding continuous sampling time points (N is an integer of one or greater) in the first distance segment T1.

Each second buffer 32b accumulates a sum total of the sampling values for M corresponding continuous sampling time points (M is an integer larger than N) in the second distance segment T2.

FIG. 6 illustrates a case where N=1, M=4 and a sampling interval of the AD converter 31 is 1 ns. The first buffer 32a accumulates the sampling values for single time. Accordingly, the first accumulation values are obtained every 1 ns. Moreover, the second buffer 32b accumulates the sum total of the sampling values for continuous four times. Accordingly, the second accumulation values are obtained every 4 ns.

Higher distance precision is generally requested for the measured object 100 that is in a short distance than in a long distance. According to the present embodiment, temporal resolution in the first distance segment T1 for a short distance is enhanced, which enables the distance precision to be improved.

Furthermore, temporal resolution in the second distance segment T2 for a long distance is reduced, which enables the number of second buffers 32b to be reduced. Accordingly, a circuit scale of the measurer 30 can be downsized and costs thereof can be reduced.

Moreover, a data size of each second buffer 32b (for example, 7 bits) is larger than a data size of each first buffer 32a (for example, 5 bits). In this way, precision of the second accumulation values can be improved in the second distance segment T2 for a long distance. Interpolation thereof can afford a value between continuous two times (distances). Precision of the interpolation can be improved because of the high precision of the second accumulation values.

Notably, the third embodiment may be combined with the second embodiment.

Fourth Embodiment

In a fourth embodiment, different emission positions of the light L1 are employed for individual frames. Hereafter, difference from the first embodiment is mainly described.

Figure 7A:
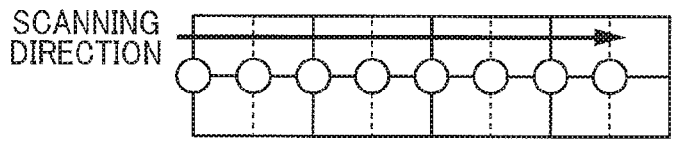
FIGS. 7A to 7C are diagrams illustrating emission positions of light L1.
Figure 7B:
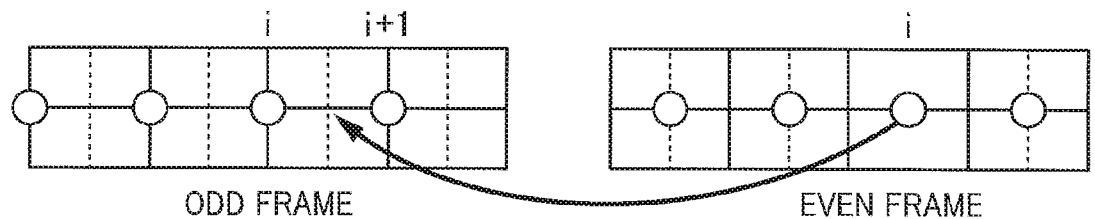
Figure 7C:
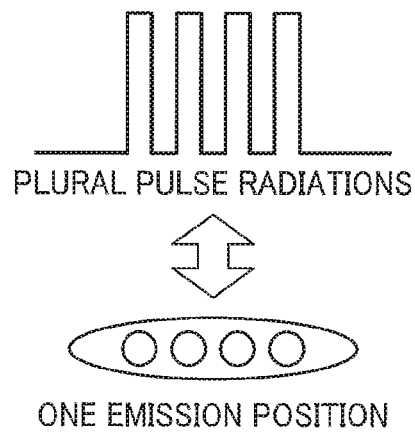

FIGS. 7A to 7C are diagrams illustrating emission positions of the light L1. FIG. 7A is a diagram illustrating emission positions in the first embodiment. In the first embodiment, the emission positions (spot positions) of the light L1 horizontally line up, which emission positions are the same for each frame.

On the contrary, in the fourth embodiment, emission positions of the light L1 are displaced for each frame. Namely, emission positions for the same emission counts are different for each frame. For example, as illustrated in FIG. 7B, emission positions are different in odd or even frames. Specifically, an emission position in an even frame is positioned substantially in the middle of the ith emission position (i is any integer of one or greater) and the (i+1)th emission position in an odd frame. Namely, two patterns of emission positions are present on a frame-by-frame basis.

Notably, n patterns of emission positions (n is an integer not less than two) may be present on a frame-by-frame basis.

Moreover, as illustrated in FIG. 7C, a set of a plurality of emission positions through a plurality of pulse radiations may be regarded as one emission position.

Figure 8A:
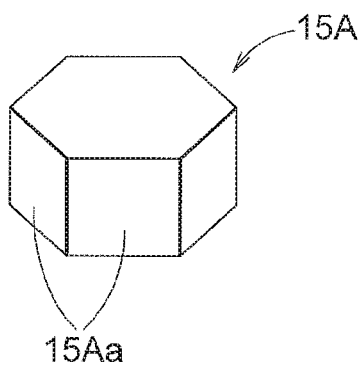
FIG. 8A is a diagram illustrating one example of a polygon mirror.
Figure 8B:
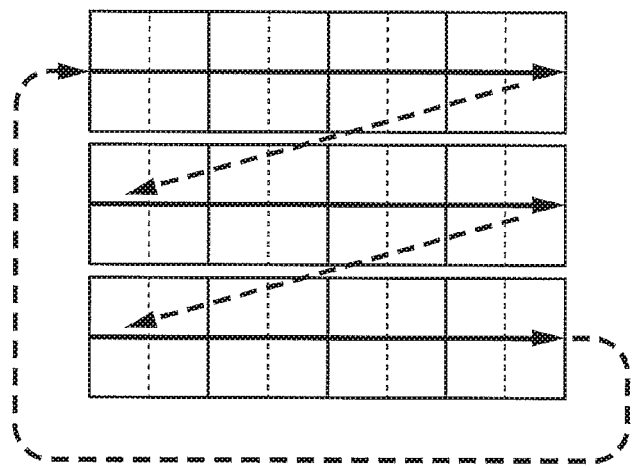
FIG. 8B is a diagram illustrating emission positions of the light L1.

Moreover, in place of the reflection device 15 having one reflective surface 15a as in FIG. 1, a polygon mirror 15A illustrated in FIG. 8A may be used. A plurality of mirror surfaces 15Aa of the polygon mirror 15A are different in inclination angle in the vertical direction. Therefore, a scanning path of the light L1 reflected on a certain mirror surface 15Aa is displaced from a scanning path of the light L1 reflected on another mirror surface 15Aa in the vertical direction. Namely, when the polygon mirror 15A has m mirror surfaces, scanning of paths displaced m times in the vertical direction can be performed. When m=3, as illustrated in FIG. 8B, one rotation of the polygon mirror 15A can cause the light L1 to be scanned on three paths in the vertical direction.

Figure 9:
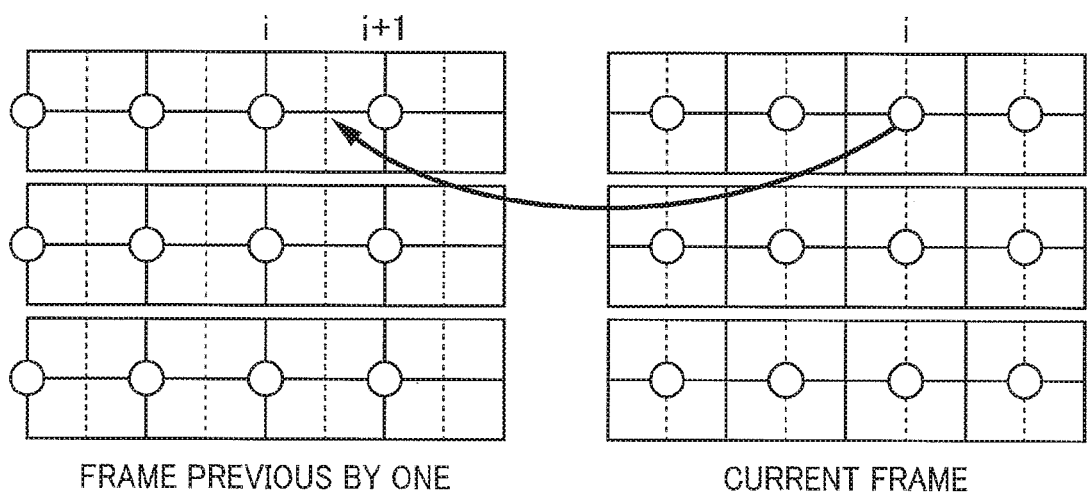
FIG. 9 is a diagram illustrating emission positions of the light L1.

In the present embodiment, the polygon mirror 15A has n times m mirror surfaces 15Aa (n is an integer not less than two) and displaces emission positions in the horizontal direction for every m frames. For example, when n=2, as illustrated in FIG. 9, the ith or (i+1)th emission position in a current frame is configured to be positioned substantially in the middle of the ith emission position and the (i+1)th irradiation position in the frame previous by one. While in FIG. 9, emission positions in the vertical direction also coincide with one another in the frame, the emission positions in the vertical direction may also be displaced.

According to the present embodiment, when motion of the measured object 100 is small, resolution in the horizontal direction can be made n times without the entire amount of power of the emitted light L1 increased. This is particularly advantageous because for in-vehicle usage, enhancement of the resolution in the horizontal direction is generally requested.

Namely, emission positions of the light L1 are different in a certain frame or in the next frame. Hence, rapid switching of the frames can achieve higher apparent resolution.

Notably, interpolation processing by the image processor 50 can also achieve apparent increase of measurement points in one frame. Specifically, an average of data of continuous two measurement points in the same frame is set as data of the middle point of those. As a method to obtain the data of the middle point, various known methods can be used. For example, a method of bilinear interpolation with surrounding four neighboring points, a method of bicubic interpolation (Bob) therewith, or the like may be used. Moreover, a method of interpolation with overlapping of data in neighboring frames (Weave) may be used.

Moreover, the fourth embodiment may be combined with the second or third embodiment.

Moreover, the measurer 30 may measure the distance based on the peak position in the accumulation values every time when the light L1 has been emitted a predetermined number of times, not using the distance segments in the first embodiment.

Fifth Embodiment

In a fifth embodiment, lights different in intensity from each other are emitted. Hereafter, difference from the first embodiment is mainly described.

The light source 11 emits first and second lights different in intensity from each other as the light L1. The light source 11 intermittently emits the first light and emits the second light which is weaker than the first light at least once during two emissions of at least part of the first light. Herein, an example in which the light source 11 alternately emits the first and second lights is described.

The reflection device 15 reflects the first and second lights to scan them on the measured object 100 and reflects the scattered light L2 of the first and second lights scattered on the measured object 100.

Moreover, the light source 11 makes emission positions of the first light different between the kth and (k+1)th frames (k is a positive integer).

Figure 10:
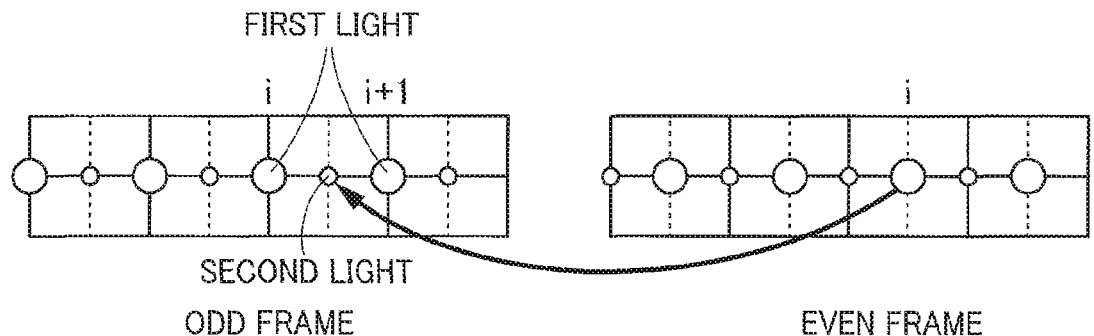
FIG. 10 is a diagram illustrating emission positions of first and second lights according to a fifth embodiment.

FIG. 10 is a diagram illustrating the emission positions of the first and second lights according to the fifth embodiment. In this example, in odd frames and even frames, the ith or (i+1)th emission position of the weak second light is positioned substantially in the middle of the ith emission position and the (i+1)th emission position of the intense first light.

Also when the polygon mirror 15A in FIG. 8A is used, the first and second lights can be emitted on the emission positions in FIG. 10.

As above, the weak second light is emitted during two emissions of the intense first light. Hence, while power of the light L1 emitted from the light source 11 is limited, emission points on the scanning path in the horizontal direction can be increased. Therefore, horizontal resolution can be improved in a distance image for a short distance.

Moreover, the intense first light is also intermittently emitted. Hence, a long distance can also be measured using the first light. Here, the emission positions of the first light are different between continuous frames, which can achieve higher apparent resolution similarly to the fourth embodiment.

Hereafter, a configuration of the drive circuit 11*b* is exemplarily described.

Figure 11:
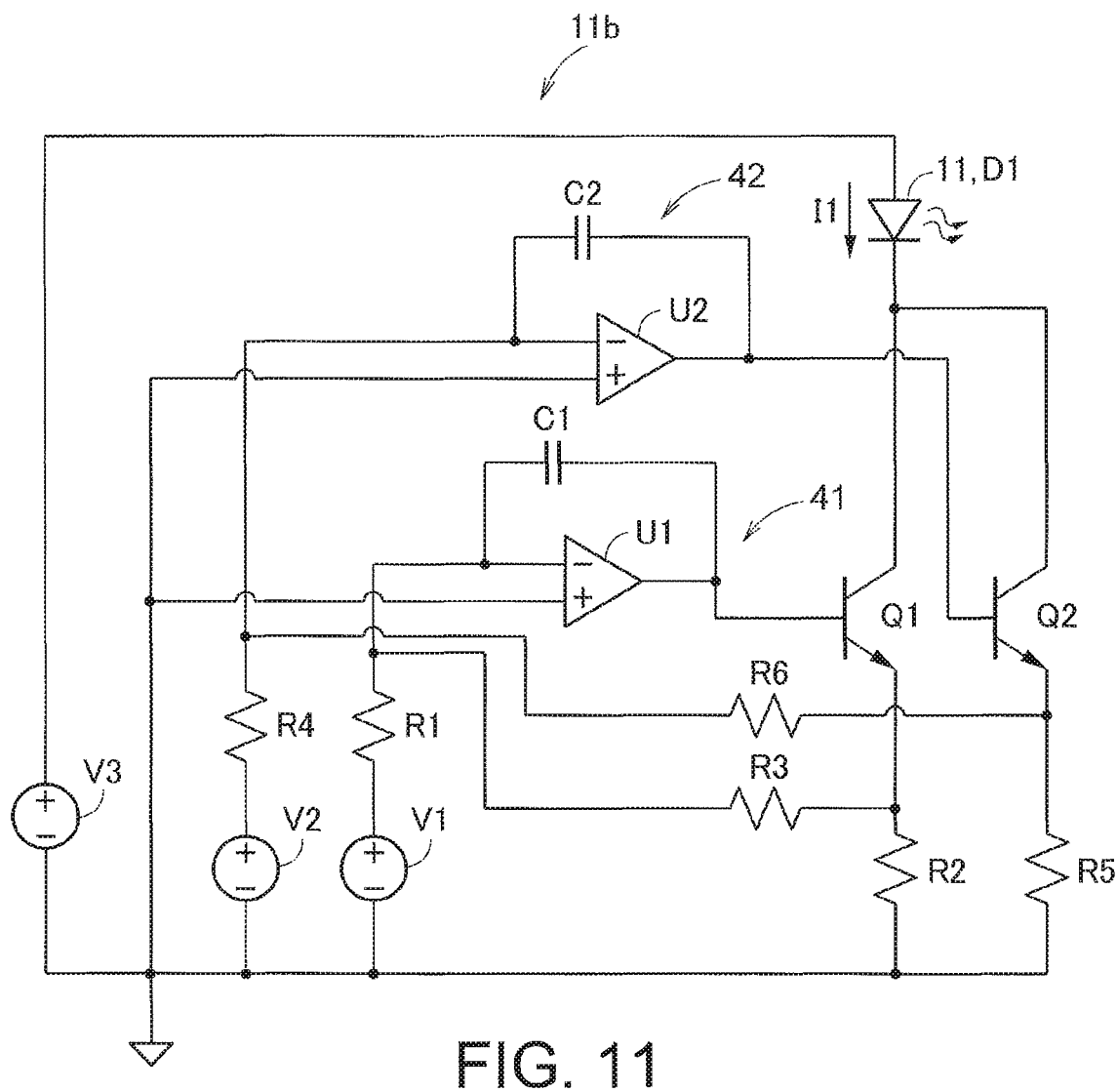
FIG. 11 is a circuit diagram of a drive circuit according to the fifth embodiment.

FIG. 11 is a circuit diagram of the drive circuit 11*b* according to a fifth embodiment. The drive circuit 11*b* drives the light source 11 based on a first pulse V1 and a second pulse V2.

The drive circuit 11*b* causes the light source 11 to emit the first light when both of the first pulse V1 and the second pulse V2 are supplied and to emit the second light when the first pulse V1 is supplied.

The light source 11 is a laser diode D1. Power supply voltage V3 is supplied to the anode of the laser diode D1.

A first driver 41 has a first resistor R1, a first amplifier U1, a first transistor Q1, a second resistor R2, a third resistor R3 and a first capacitance element C1. The first driver 41 causes current I1 in the light source 11 when the first pulse V1 is supplied.

The first resistor R1 has one end to which the first pulse V1 is supplied.

The first amplifier U1 has an inversion input terminal (first input node) to which the other end of the first resistor R1 is connected, a non-inversion input terminal (second input node) to which ground voltage (reference voltage) is supplied, and an output terminal (first output node) from which a first output signal obtained by amplifying a difference between the voltage of the inversion input terminal and the ground voltage is outputted.

The first transistor Q1 is an NPN-type bipolar transistor. It has a collector (one end) connected to the cathode of the laser diode D1 and is controlled with the first output signal supplied to its base.

The second resistor R2 has one end connected to an emitter (the other end) of the first transistor Q1 and the other end to which the ground voltage is supplied.

The third resistor R3 has one end connected to the emitter of the first transistor Q1 and the other end connected to the inversion input terminal of the first amplifier U1.

The first capacitance element C1 is connected between the inversion input terminal and the output terminal of the first amplifier U1.

A second driver 42 has a fourth resistor R4, a second amplifier U2, a second transistor Q2, a fifth resistor R5, a sixth resistor R6 and a second capacitance element C2. The second driver 42 causes the current I1 to flow in the light source 11 when the second pulse V2 is supplied.

The fourth resistor R4 has one end to which the second pulse V2 is supplied.

The second amplifier U2 has an inversion input terminal (third input node) in which the other end of the fourth resistor R4 is connected, a non-inversion input terminal (fourth input node) in which the ground voltage is supplied, and an output terminal (second output node) from which a second output signal obtained by amplifying a difference between the voltage of the inversion input terminal and the ground voltage is outputted.

The second transistor Q2 is an NPN-type bipolar transistor. It has a collector (one end) connected to the cathode of the laser diode D1 and is controlled with the second output signal supplied to its base.

The fifth resistor R5 has one end connected to an emitter (the other end) of the second transistor Q2 and the other end to which the ground voltage is supplied.

The sixth resistor R6 has one end connected to the emitter of the second transistor Q2 and the other end connected to the inversion input terminal of the second amplifier U2.

The second capacitance element C2 is connected between the inversion input terminal and the output terminal of the second amplifier U2.

Figure 12:
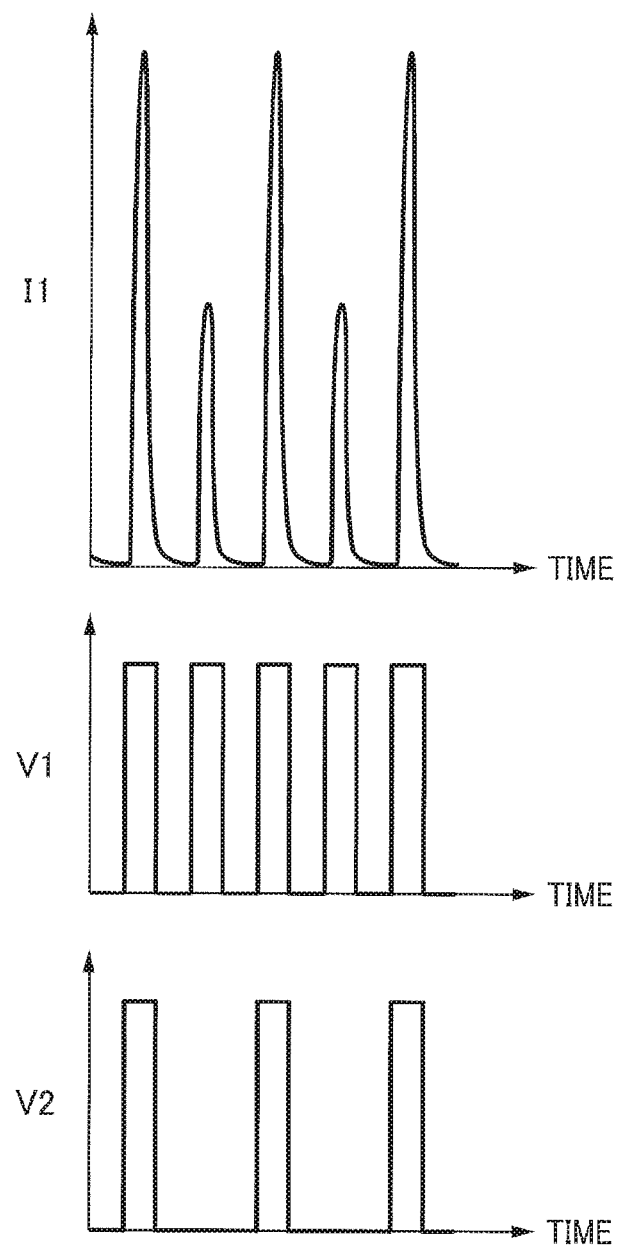
FIG. 12 is a waveform chart a first pulse V1, a second pulse V2 and current I1 flowing in a light source.

FIG. 12 is waveform charts of the first pulse V1, the second pulse V2 and the current IL When both of the first pulse V1 and the second pulse V2 are supplied, larger current I1 flows in the light source 11, which emits intense first light.

The drive circuit 11*b* as above includes two first and second drivers 41 and 42. Hence, more intense light L1 can be emitted as compared with the case of including any one of the drivers. Moreover, as the second pulse V2, a pulse whose interval is short similarly to the first pulse V1 in FIG. 12 can also be inputted with its timing displaced from that of the first pulse V1. Thereby, the light L1 can be emitted at shorter intervals. In this way, horizontal resolution can be further improved.

Figure 13:
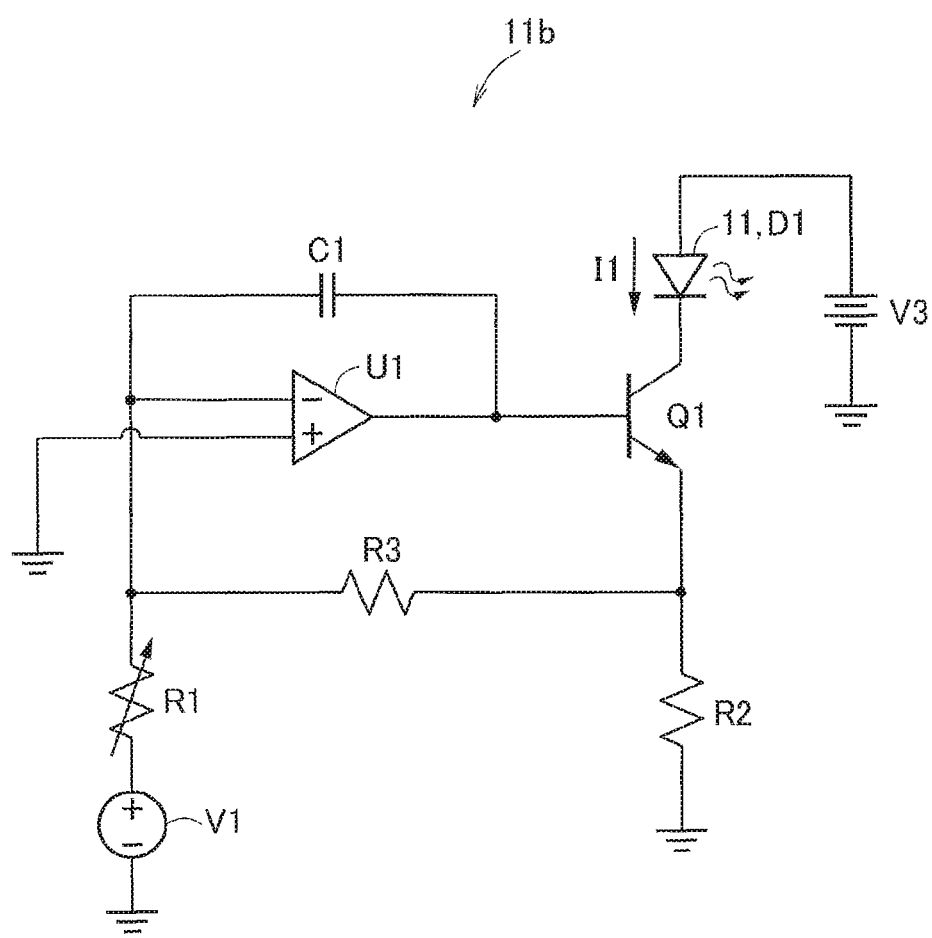
FIG. 13 is another circuit diagram of the drive circuit.

FIG. 13 is a circuit diagram of another example of the drive circuit 11*b*. This drive circuit 11*b* has a similar configuration to the first driver 41 in FIG. 11 and does not have the second driver 42. The resistor R1 is configured as a variable resistor. A resistance value of the resistor R1 is periodically changed in response to the first pulse V1. Thereby, the current I1 illustrated in FIG. 12 can be obtained. In place of the resistor R1, the resistor R2 or R3 may be configured as the variable resistor. As the configuration of the variable resistor, for example, there may be employed a configuration in which two resistors are connected in series and whether or not both ends of one of these resistors are subjected to short circuit is switched.

As above, according to the present embodiment, horizontal resolution of the distance image for a short distance can be improved. Moreover, a long distance can also be measured and higher apparent horizontal resolution of the distance image for a long distance can be achieved.

Notably, the emission positions of the first and second lights may be the same in each frame. In this case, horizontal resolution can be improved in the distance image for a short distance. Nevertheless, since the scattered light of the weak second light cannot be used for a long distance, horizontal resolution of the distance image for a long distance deteriorates more than horizontal resolution for a short distance.

Moreover, the fifth embodiment may be combined with the second or third embodiment.

Moreover, the measurer 30 may measure the distance based on the peak position in the accumulation values every time when the light L1 has been emitted a predetermined number of times without using the distance segments in the first embodiment.

At least part of the measurer 30 described in the aforementioned embodiments may be configured of hardware or may be configured of software. In the case of the configuration with software, a program to implement at least part of functions of the measurer 30 may be stored in a recording medium such as a flexible disk and a CD-ROM, and read in and performed on a computer. The recording medium is not limited to be removable, such as a magnetic disk and an optical disk, but may be a fixed recording medium such as a hard disk device and a memory.

Moreover, the program to implement at least part of functions of the measurer 30 may be distributed via a communication line (including wireless communication) such as the Internet. Furthermore, the program may be encrypted, modulated or compressed, and in this state, distributed via a wired line or a wireless line such as the Internet or in the state of being recorded in a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device which emits light intermittently and measures distance based on the time between the time when the light is emitted and the time when the light which is scattered on the measured object is detected, the device comprising:
   an optical detector to detect the scattered light;
   a light source to intermittently emit first light and to emit second light which is weaker in power than the first light at least once during two emissions of at least part of the first light;
   an optical mechanism system to scan the first light and the second light on the surface of the measured object and to inject the first light and the second light scattered on the measured object into the optical detector;
   a measurer to measure a distance to each position on the measured object based on a detection result of the optical detector; and
   a drive circuit to drive the light source based on a first pulse and a second pulse, wherein
   the drive circuit has
   a first driver to cause current to flow in the light source, and cause the light source to emit the first light when the first pulse is supplied, and
   a second driver to cause current to flow in the light source, and cause the light source to emit the second light when the second pulse is supplied.

2. The distance measuring device according to claim 1, wherein the light source alternately emits the first light and the second light.

3. The distance measuring device according to claim 1, wherein the light source makes emission positions of the first light in a kth frame (k is a positive integer) and emission positions of the first light in a (k+1)th frame different from each other.

4. The distance measuring device according to claim 1, wherein the first driver has
   a first resistor having one end to which the first pulse is supplied,
   a first amplifier having a first input node to which the other end of the first resistor is connected, a second input node to which reference voltage is supplied, and a first output node to output a first output signal obtained by amplifying a difference between voltage of the first input node and the reference voltage,
   a first transistor having one end connected to the light source and controlled with the first output signal,
   a second resistor having one end connected to the other end of the first transistor and the other end to which the reference voltage is supplied,
   a third resistor having one end connected to the other end of the first transistor and the other end connected to the first input node, and
   a first capacitance element connected between the first input node and the first output node, and
   the second driver has
   a fourth resistor having one end to which the second pulse is supplied,
   a second amplifier having a third input node to which the other end of the fourth resistor is connected, a fourth input node to which the reference voltage is supplied, and a second output node to output a second output signal obtained by amplifying a difference between voltage of the third input node and the reference voltage,
   a second transistor having one end connected to the light source and controlled with the second output signal,
   a fifth resistor having one end connected to the other end of the second transistor and the other end to which the reference voltage is supplied,
   a sixth resistor having one end connected to the other end of the second transistor and the other end connected to the third input node, and
   a second capacitance element connected between the third input node and the second output node.

5. A distance measuring device which emits light intermittently and measures distance based on the time between the time when the light is emitted and the time when the light which is scattered on a measured object is detected, the device comprising:
   an optical detector to detect the scattered light;
   a light source to intermittently emit first light for each frame and to emit second light which is weaker in power than the first light at least once during two emissions of at least some of the first light in at least one frame, wherein the frame indicates an irradiation range for one cycle as the emission positions to the measured object
   an optical mechanism system to scan the first light and the second light on the surface of the measured object and to inject the first light and the second light scattered on the measured object into the optical detector; and
   a measurer to measure a distance to each position on the measured object based on a detection result of the optical detector, wherein
   the light source makes emission directions of the first light in a kth frame (k is a positive integer) and emission directions of the first light in a (k+1)th frame different from each other.

6. The distance measuring device according to claim 5, wherein the light source alternately emits the first light and the second light.

7. The distance measuring device according to claim 5, comprising a drive circuit to drive the light source based on a first pulse and a second pulse, wherein the drive circuit causes the light source to emit the first light when the first pulse and the second pulse are supplied, and causes the light source to emit the second light when the first pulse is supplied.

8. The distance measuring device according to claim 7, wherein the drive circuit has
- a first driver to cause current to flow in the light source when the first pulse is supplied, and
- a second driver to cause current to flow in the light source when the second pulse is supplied.

9. The distance measuring device according to claim 8, wherein the first driver has
- a first resistor having one end to which the first pulse is supplied,
- a first amplifier having a first input node to which the other end of the first resistor is connected, a second input node to which reference voltage is supplied, and a first output node to output a first output signal obtained by amplifying a difference between voltage of the first input node and the reference voltage,
- a first transistor having one end connected to the light source and controlled with the first output signal,
- a second resistor having one end connected to the other end of the first transistor and the other end to which the reference voltage is supplied,
- a third resistor having one end connected to the other end of the first transistor and the other end connected to the first input node, and
- a first capacitance element connected between the first input node and the first output node, and the second driver has
- a fourth resistor having one end to which the second pulse is supplied,
- a second amplifier having a third input node to which the other end of the fourth resistor is connected, a fourth input node to which the reference voltage is supplied, and a second output node to output a second output signal obtained by amplifying a difference between voltage of the third input node and the reference voltage,
- a second transistor having one end connected to the light source and controlled with the second output signal,
- a fifth resistor having one end connected to the other end of the second transistor and the other end to which the reference voltage is supplied,
- a sixth resistor having one end connected to the other end of the second transistor and the other end connected to the third input node, and
- a second capacitance element connected between the third input node and the second output node.

10. A distance measuring device which emits light intermittently and measures distance based on the time between the time when the light is emitted and the time when the light which is scattered on the measured object is detected, the device comprising:
- an optical detector to detect the scattered light;
- a light source to intermittently emit first light and to emit second light which is weaker in power than the first light at least once during two emissions of at least part of the first light;
- an optical mechanism system to scan the first light and the second light on the surface of the measured object and to inject the first light and the second light scattered on the measured object into the optical detector; and
- a measurer to measure a distance to each position on the measured object based on a detection result of the optical detector, wherein the light source makes emission directions of the first light in a kth frame (k is a positive integer) and emission directions of the first light in a (k+1)th frame different from each other, and the ith or (i+1)th emission position of the second light is positioned substantially in the middle of the ith emission position and the (i+1)th emission position of the first light.

11. The distance measuring device according to claim 10, wherein the light source alternately emits the first light and the second light.

12. The distance measuring device according to claim 10, comprising
- a drive circuit to drive the light source based on a first pulse and a second pulse, wherein the drive circuit causes the light source to emit the first light when the first pulse and the second pulse are supplied, and causes the light source to emit the second light when the first pulse is supplied.

13. The distance measuring device according to claim 12, wherein
the drive circuit has
- a first driver to cause current to flow in the light source when the first pulse is supplied, and
- a second driver to cause current to flow in the light source when the second pulse is supplied.

14. The distance measuring device according to claim 13, wherein
the first driver has
- a first resistor having one end to which the first pulse is supplied,
- a first amplifier having a first input node to which the other end of the first resistor is connected, a second input node to which reference voltage is supplied, and a first output node to output a first output signal obtained by amplifying a difference between voltage of the first input node and the reference voltage,
- a first transistor having one end connected to the light source and controlled with the first output signal,
- a second resistor having one end connected to the other end of the first transistor and the other end to which the reference voltage is supplied,
- a third resistor having one end connected to the other end of the first transistor and the other end connected to the first input node, and
- a first capacitance element connected between the first input node and the first output node, and the second driver has
- a fourth resistor having one end to which the second pulse is supplied,
- a second amplifier having a third input node to which the other end of the fourth resistor is connected, a fourth input node to which the reference voltage is supplied, and a second output node to output a second output signal obtained by amplifying a difference between voltage of the third input node and the reference voltage,
- a second transistor having one end connected to the light source and controlled with the second output signal, a fifth resistor having one end connected to the other end of the second transistor and the other end to which the reference voltage is supplied,
a sixth resistor having one end connected to the other end of the second transistor and the other end connected to the third input node, and a second capacitance element connected between the third input node and the second output node.

\* \* \* \* \*